United States Patent
Lee et al.

(10) Patent No.: US 6,393,280 B1
(45) Date of Patent: May 21, 2002

(54) RADIO INTERFACE UNIT AND METHOD OF CONTROLLING MULTIPLE/SINGLE MODE THEREOF IN WIRELESS LOCAL LOOP NETWORK SYSTEM

(76) Inventors: Hun Lee, 305-1405, Family Apt,, 150, Munjong-dong, Songpa-ku, Seoul; Yunn-Ghee Kim, 2-401, Joongang Heights Apt,, 476, Sangil-dong, Kangdong-ku, Seoul; Sung-Gyu Choi, 103-105, Hyundai Sawon Imdae Apt., Pubal-eub, Ichon-shi, Kyonggi-do; Sang-Jin Hur, 821-4, Bon-dong, Dalseo-ku, Taegu-shi; Su-Man Eo, 20-2, 488-100, Dapsipri-5 dong, Dongdaemun-ku, Seoul, all of (KR)

( * ) Notice: Subject to any disclaimer, the term of this patent is extended or adjusted under 35 U.S.C. 154(b) by 0 days.

(21) Appl. No.: 09/515,423

(22) Filed: Feb. 29, 2000

(30) Foreign Application Priority Data

Mar. 4, 1999 (KR) .............................................. 99-7122

(51) Int. Cl.[7] .............................. H04B 7/00; H04Q 7/20
(52) U.S. Cl. ....................... 455/426; 455/557; 455/550; 455/553; 455/3.05
(58) Field of Search ......................... 455/3.05, 424–426, 455/450, 462–465, 502, 550, 552, 553, 555, 557, 560, 561, 562, 507, 522

(56) References Cited

U.S. PATENT DOCUMENTS

| | | | | |
|---|---|---|---|---|
| 5,224,097 A | * | 6/1993 | Kaneshima | 370/85.8 |
| 5,781,856 A | | 7/1998 | Jacobs et al. | 455/403 |
| 6,188,912 B1 | * | 2/2001 | Struhsaker et al. | 455/561 |

FOREIGN PATENT DOCUMENTS

| | | | | |
|---|---|---|---|---|
| EP | 0700175 A | * | 3/1996 | ............ H04B/7/26 |
| EP | 1009182 | * | 6/2000 | ............ H04Q/7/36 |
| JP | 408307376 | * | 11/1996 | ............ H04J/3/00 |

* cited by examiner

*Primary Examiner*—Nguyen T. Vo
*Assistant Examiner*—Duc Nguyen
(74) *Attorney, Agent, or Firm*—Lawrence G. Kurland, Esq.; Bryan Cave LLP

(57) ABSTRACT

A modulator-demodulator (modem) used in radio interface unit (RIU) is modeled as master and slave, respectively, so as to allow a rapid handling of service, a stabilized system, and an efficient utilization of wireless systems. The RIU in wireless local loop network system, in which the RIU has a subscriber interface module for interface with subscriber terminal and data, a high frequency processing module for transmitting/receiving radio data to/from a radio port via an antenna, and a modem for converting and interfacing data between the subscriber interface module and the high frequency module, includes: a modem unit having a master modem which performs an automatic frequency control function for a direct control of a high frequency, power control function, and automatic gain control function, and is provided with a pilot channel, power control channel, and signaling channel only when the master modem operates as a primary one, and a plurality of slave modems which have pilot, power control and signaling channels and receive power control and signaling channels only when the slave modems operate as a primary one, and which receive only the power control and signaling channels when they operate as a secondary one; and a control module for controlling transmitting/receiving state of the modem unit and state of the subscriber interface module.

9 Claims, 7 Drawing Sheets

RADIO INTERFACE UNIT AND METHOD OF CONTROLLING MULTIPLE/SINGLE MODE THEREOF IN WIRELESS LOCAL LOOP NETWORK SYSTEM

BACKGROUND OF THE INVENTION

1. Field of the Invention

The present invention relates to a method of controlling multiple/single mode in a wideband wireless local loop (W-WLL) network system. More particularly, the present invention relates to a radio interface unit (RIU) and a method of controlling multiple/single mode of such an RIU in a wireless local loop (WLL) system, in which both the multiple and single mode services can be performed by a single algorithm, and a modulator-demodulator (modem) used in RIU is modeled as "master" and "slave", respectively, to thereby allow a rapid handling of service, a stabilized system, and an efficient utilization of wireless systems.

2. Description of the Related Art

In general, WLL system is similar to a mobile communication network in that WLL system uses wireless channels as a communication medium. However, WLL system is not provided with mobility, and therefore, a communication environment thereof is further excellent than that of mobile communication system.

WLL system has further advantage in that a line-of-sight environment is secured and a propagation path loss is low, say, is approximately 20 dB/decade, thus allowing a wide area service using the same amount of transmitting power. In addition, WLL system is a fixed communication system employing a point-to-point transmission method, and has less fading caused by a multiple path than the propagation environment of mobile communication system that employs a point-to-station transmission method.

Due to such advantages, development and study on WLL system has been actively performed. FIG. 1 is a schematic view of a common WLL network system having the above-described advantages.

The WLL network system shown in FIG. 1 consists of a terminal 10, a radio interface unit(RIU) 20, a radio port (RP) 30, a radio port controller 40, a WLL exchanger 50, and a radio port operation & maintenance center (RPOM) 60.

An inter-working function (IWF) 70, and a home location resister/authentication center are added to thus-configured WLL system.

WLL system further includes a network management center 90 connected to RPOM 60 and WLL exchanger 50, and a charging center 100 connected to WLL exchanger 50 and IWF 70.

Thus-configured WLL has an interface method among network components as follows.

A common WLL interface standard is used as an interface standard between RIU 20 and RP 30, wherein a channel bandwidth is 10 MHz. Either E1 wire connection or HDSL is used as an interface standard between RP 30 and RP controller 40, and link access procedure D(LAPD) as a signal transmission protocol. E1 wire connection is used as an interface standard between RP controller 40 and WLL exchanger 50, and ITU.T G.965 as a signal transmission method. Ethernet is used between RP controller 40 and RPOM 60 as an interface standard, and simple network management protocol (SNMP), filter transfer protocol (FTP), telecommunication network (TELNET) and the like as a signal transmission method. E1 wire connection is employed between RP controller 40 and IWF 70 as an interface standard, and LAPD as a signal transmission protocol. In addition, E1 wire connection is employed as an interface standard between WLL exchanger 50 and IWF 70, and R2 as a signal transmission method. E1 wire connection is employed as an interface standard between WLL exchanger 50 and home location register (HLR), and IS-41C as a signal transmission method.

A conventional WLL system has the above-described components operating as follows.

First, RP 30 is made up of a radio port control module for performing an overall management function onto the radio port, a modem module for performing CDMA channel-related signal processing function, an RF module for performing a high power/low noise amplification and a transmitting/receiving frequency converting function, and a line connection module for linking to E1 wire connection for a match with RP controller 40.

Thus-structured RP 30 performs such functions as a transmitted signal amplification, low noise amplification of a received signal, frequency upward/downward conversion, diversity receipt via two antennas, high power/low noise amplification, and transmitting/receiving frequency conversion. In addition, modem module performs provider function of CDMA channel(pilot channel, synchronization channel, paging channel, access channel, signaling channel, traffic channel, packet traffic channel and packet access channel), digital baseband function, and CDMA channel coding and decoding-related function. In addition, line connection module performs data communication with the RP controller in regards of traffic and control data, and link line (E1/HDSL) function for a match with RP controller.

RP controller 40 for controlling RP 30 includes a transcoder module, a call processing module, a switching module, and a matching module.

The transcoder module further includes a transcoder for converting to 64 kbps PCM voice coded signal, and is provided with an echo canceller function. The call processing module is a processor for performing various kinds of call processing functions, for example, supporting of transmitted/received call processing of radio port, and processing of messages, and other functions like management of subsystem within RP controller and formatting of control signal between WLL exchanger and subscriber interface equipment. The call processing module has a duplex structure for system reliability enhancement.

The switching module provides a traffic path between an RP matching equipment and a transcoder in RP. The matching module consists of an WLL exchanger matching module, an RP matching module, and an RPOM matching module, wherein WLL exchanger matching module performs E1/G.965 digital link matching function when the RP controller is installed in remote location with respect to the WLL exchanger. The RP matching module serves as a match of E1/LAPD, HDSL link line between RP and RP controller, and RPOM matching module serves as a match of Ethernet/SNMP, FPT, TELNET between RPOM and RP controller.

RPOM 60 operates RPC 40, RP 30, and RIU 20, and serves to the maintenance of the above-described equipment.

RIU 20 includes a high frequency processing module 21, a modem 22 for processing a digital signal, and a subscriber interface module 23, as shown in FIG. 2.

Here, high frequency processing module 21 amplifies a transmitted signal, low noise of a received signal, and performs a frequency upward/downward converting function. That is, high frequency processing module 21 transmits/receives data to/from a radio port via an antenna. Subscriber interface module 23 consists of BRI, SLIC, and SIO, etc, wherein BRI provides ISDN U-interface function for a physical interface with ISDN subscribers. SLIC performs A/D conversion and D/A conversion by being linked to an analog line, and serves as a line feeder, and ring signal and tone signal provider. SIO interfaces with RS-232C for a connection with a serial port so as to provide a digital data terminal interface function.

Modem 22, a digital processing block, is connected to high frequency processing module 21 in a searcher 22a so as to extract only a desired channel signal from the received signal. A power controller 22b controls power by detecting the strength of the channel signal extracted by searcher 22a. In addition, a phase tracking portion 22c traces a phase from a channel signal extracted by searcher 22a, and performs an automatic frequency control function, when phase difference occurs, so as to compensate such a phase difference. An automatic gain controller 22d variably controls the gain of the amplifier in accordance with the strength of the received signal obtained from searcher 22a. A receiver 22e serves to convert CDMA signal of RF band passed through searcher 22a to a baseband signal. Thus-converted baseband signal undergoes a series of process, say, demodulation, de-interleaving, and channel decoding in a channel encoder/decoder 22f, and is transmitted to subscriber interface module 23. In addition, subscriber data transmitted from subscriber interface module 23 is modulated to CDMA signal, interleaved, and channel coded in channel encoder/decoder 22f, and is band-diffused in a bad diffuser 22g. The band-diffused signal is filtered to a predetermined band in FIR filter 22h, transmitted to high frequency processing module 21, and is transmitted as an RF signal.

However, such a subscriber interface equipment is in a single mode (one traffic channel and one signal channel) where only a single modem is used. If a subscriber interface equipment is configured in a multiple mode (plural traffic channels and a single signal channel) employing a plurality of modems, an activated modem among a plurality of modems has to perform an automatic frequency control (AFC) function, power control (PC) function, and automatic gain control (AGC) function, thus causing frequent switching of the modem. That is, when a first modem performs an interface, the first modem also has to perform such functions as an automatic frequency control, automatic gain control, and power control, and when a second modem also has to perform an interface, the second modem also has to perform functions same as those of first modem, a modem switch is required.

Accordingly, since the multiple mode subscriber equipment is implemented using a plurality of modems, a frequent modem switching is required. In such a case, a speedy modem switching is required, which disturbs smooth operation of each modem in such functions as an automatic frequency control, automatic gain control, and power control.

SUMMARY OF THE INVENTION

Therefore, it is an object of the present invention to provide a multiple/single mode control method in wireless local loop network system which allows both multiple and single mode services by a single algorithm.

It is another object of the present invention to provide a radio interface unit in wireless local loop network system which allows stability of system and an efficient use of wireless source by implementing a modem of the radio interface unit in the concept of master and slave so as to achieve a speedy service handling.

To accomplish the above object of the present invention, there is provided a radio interface unit in wireless local loop network system, in which the radio interface unit includes a subscriber interface module for interface with subscriber terminal and data, a high frequency processing module for transmitting/receiving radio data to/ from the radio port via an antenna, and a modem for converting and interfacing data between the subscriber interface module and the high frequency module, the radio interface unit including: a modem unit having a master modem which performs an automatic frequency control function for a direct control of a high frequency, power control function, and automatic gain control function, and is provided with a pilot channel, power control channel, and signaling channel only when the master modem operates as a primary one, and a plurality of slave modems which have the pilot, power control, and signaling channels and receive the power control and signaling channels only when the slave modems operate as a primary modem, and which receive only the power control channel and signaling channel when they operate as a secondary modem; and a control module for controlling transmitting/receiving state of the modem unit and state of the subscriber interface module.

To accomplish the above object of the present invention, there is provided a method of controlling a single mode of radio interface unit in wireless local loop network system, in a method of controlling radio interface unit in wireless local loop network system, the method of controlling a single mode of radio interface unit including: a first step of obtaining a pilot signal by initializing master/slave modems and shifting the master modem into a state where a pilot signal is obtained; a second step of obtaining a synchronization by shifting the master modem to a state where a synchronization is obtained; a third step of receiving system information message, shifting the modem to a call processing standby state, and confirming whether a call request exists or not; a fourth step of achieving power control and call processing by confirming whether the call request is an initial event or not, when the call request exists, and setting the master modem to a primary modem if the call request is an initial event; a fifth step of setting the slave modem to a secondary modem when the call request is not an initial event, performing power control on the secondary modem via the master modem, and controlling the secondary modem to perform the call processing; a sixth step of releasing the call connected via the master modem and shifting the master modem to a call standby state when the call processing in the master modem ends in the fifth step, and checking the state of the secondary modem and performing power control on the master modem when the secondary modem is in a call state; and a seventh step of releasing the call which is connected to the secondary modem when the call processing in the secondary modem ends, shifting the secondary modem to a call standby state, and completing the control on modems.

To accomplish the above object of the present invention, there is provided a method of controlling a multiple mode of radio interface unit in wireless local loop network system, in a method of controlling radio interface unit in wireless local loop network system, the method of controlling a multiple mode of radio interface unit including: a first step of obtaining a pilot signal by initializing master/slave modems and shifting the master modem into a state where a pilot signal is obtained; a second step of obtaining a synchronization by shifting the master modem to a state where a synchronization is obtained; a third step of receiving system information message, shifting the master and slave modems to a paging state, and confirming whether a call request exists or not; a fourth step of achieving power control and call processing by activating the master modem to an access mode when a call request is occurred via the master modem, allocating a channel thereto, and setting the master modem to a primary modem; a fifth step of setting the slave modem to a secondary modem when a call request occurs via the slave modem during call processing of the master modem, and controlling the secondary modem to perform the call processing; a sixth step of activating the slave modem to an access mode when a call request is occurred via the slave modem, allocating a channel thereto, setting the slave modem to a primary modem, performing a power control on the slave modem via the master modem, and controlling the slave modem to perform the call processing; a seventh step of setting the master modem to a secondary modem when a call request occurs via the master modem during a call processing of the slave modem, and controlling the secondary modem to perform a call processing; an eighth step of releasing the call connected to the master modem if the call processed in the master modem ends at the state where the master modem operates as a primary modem and the slave modem operates as a secondary modem, and setting the slave modem to a primary modem; and a ninth step of releasing the call connected to the slave modem if the call processed in the slave modem ends at the state where the slave modem operates as a primary modem and the master modem operates as a secondary modem, and setting the master modem to a primary modem.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

The present invention will be explained in more detail with reference to the attached drawings.

Figure 3:
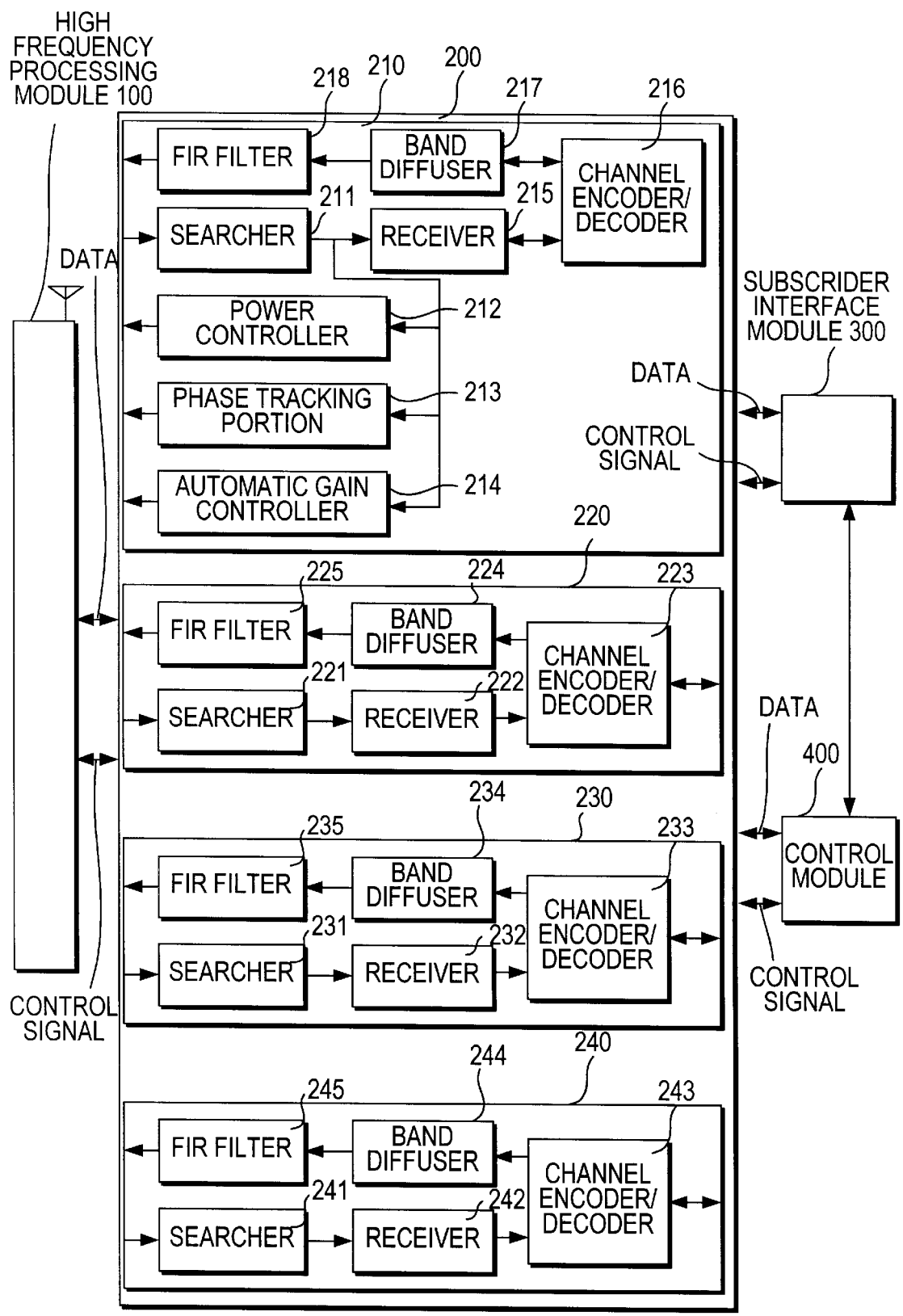
FIG. 3 is a block diagram illustrating a radio interface unit in wireless local loop network system according to the present invention.

Referring to FIG. 3, a radio interface unit (RIU) in wireless local loop (WLL) network system of the present invention includes a subscriber interface module 300 for interfacing a subscriber terminal and data, a high frequency processing module 100 for transmitting/receiving radio data to/from a radio port via an antenna, a modem unit 200 for converting and interfacing data between subscriber interface module 300 and high frequency processing module 100, and a control module 400 for controlling transmitting/receiving operation of modem unit 200 and the operation of subscriber interface module 300.

Modem unit 200 includes a master modem 210 which performs an automatic frequency control function for a direct control of a high frequency, power control function, and automatic gain control function, and is provided with a pilot channel, power control channel, and signaling channel only when the master modem operates as a primary one, and a plurality of slave modems 220, 230, and 240 to which a pilot channel, power control channel, and signaling channel are provided only when they operate as a primary modem, and which receive only the power control channel and signaling channel when they operate as a secondary modem.

A method of controlling RIU in single/multiple modes according to the present invention will be explained with reference to FIGS. 4 to 9.

Figure 1:
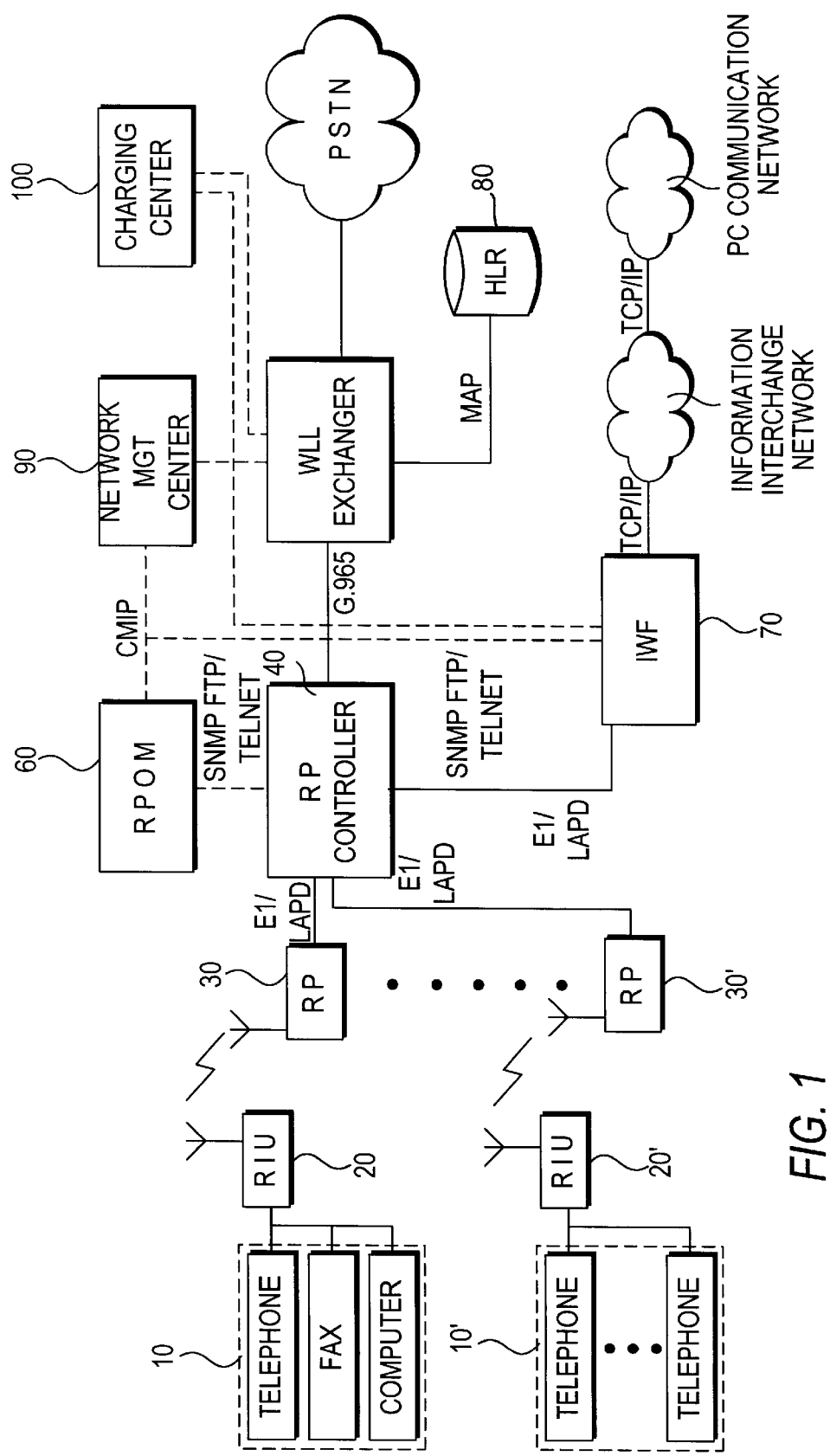
FIG. 1 is a block diagram illustrating a conventional wideband wireless local loop network system.
Figure 2:
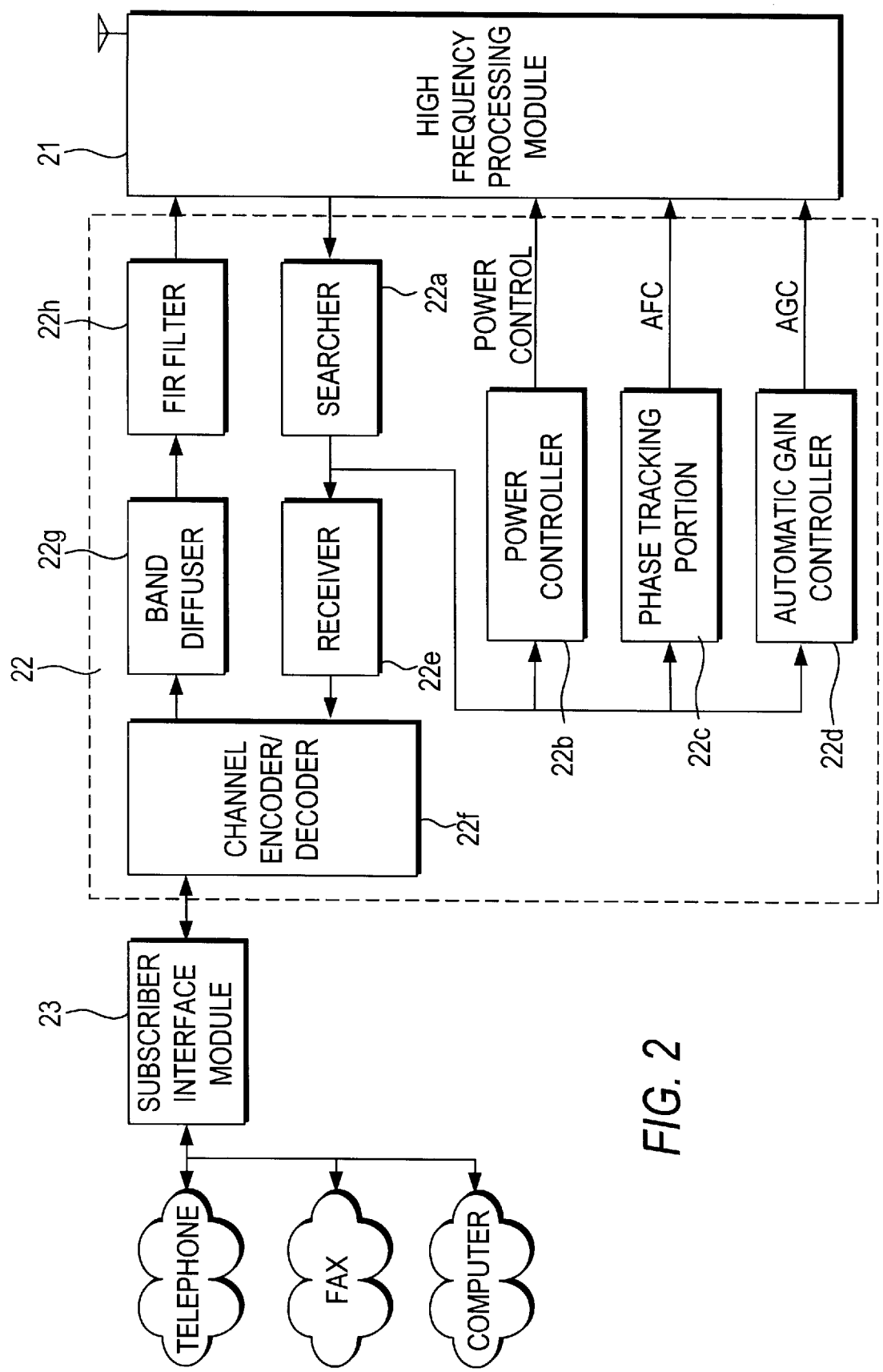
FIG. 2 is a detailed block diagram illustrating a radio interface unit shown in FIG. 1.

High frequency processing module 100 and subscriber interface module 300 shown in FIG. 3 will be similar in structure and functionality to high frequency processing module 21 and subscriber interface module 23 shown in FIG. 2. Therefore, detailed description thereof will be omitted.

Modem unit 200 includes a single master modem 210 and a plurality of slave modems 220, 230, 240, wherein master modem 210 has configuration and operation similar to those of modem 22 of FIG. 2. That is, master modem 210 performs an automatic frequency control function for directly controlling a radio frequency, power control function, and automatic gain control function, and is provided with pilot, power control, and signaling (PPCS) channels only when master modem 210 operates as a primary modem. Master modem 210 is firmly fixed regardless of single mode or multiple mode, and receives power control and signaling channels.

Differently from master modem 210, slave modems 220, 230, and 240 do not have such functions as automatic frequency control, power control, or automatic gain control, and are provided with pilot, power control, and signaling channels only when the salve modems operate as a primary one.

Here, each modem may operate as a primary or a secondary one, and a traffic channel and PPCS channels co-exist always in the primary modem. When, traffic channel in the primary modem is released, the secondary one where the most recent traffic channel is set up serves as a primary one. If such is the case, the master modem performs sequentially the automatic frequency control function, power control function, and automatic gain control function. PPCS channels do not exist in the secondary modem.

As described above, control module 400 controls each modem by setting it to a primary or a secondary one, and such a modem control may vary in accordance with a mode (single or multiple).

Figure 4A:
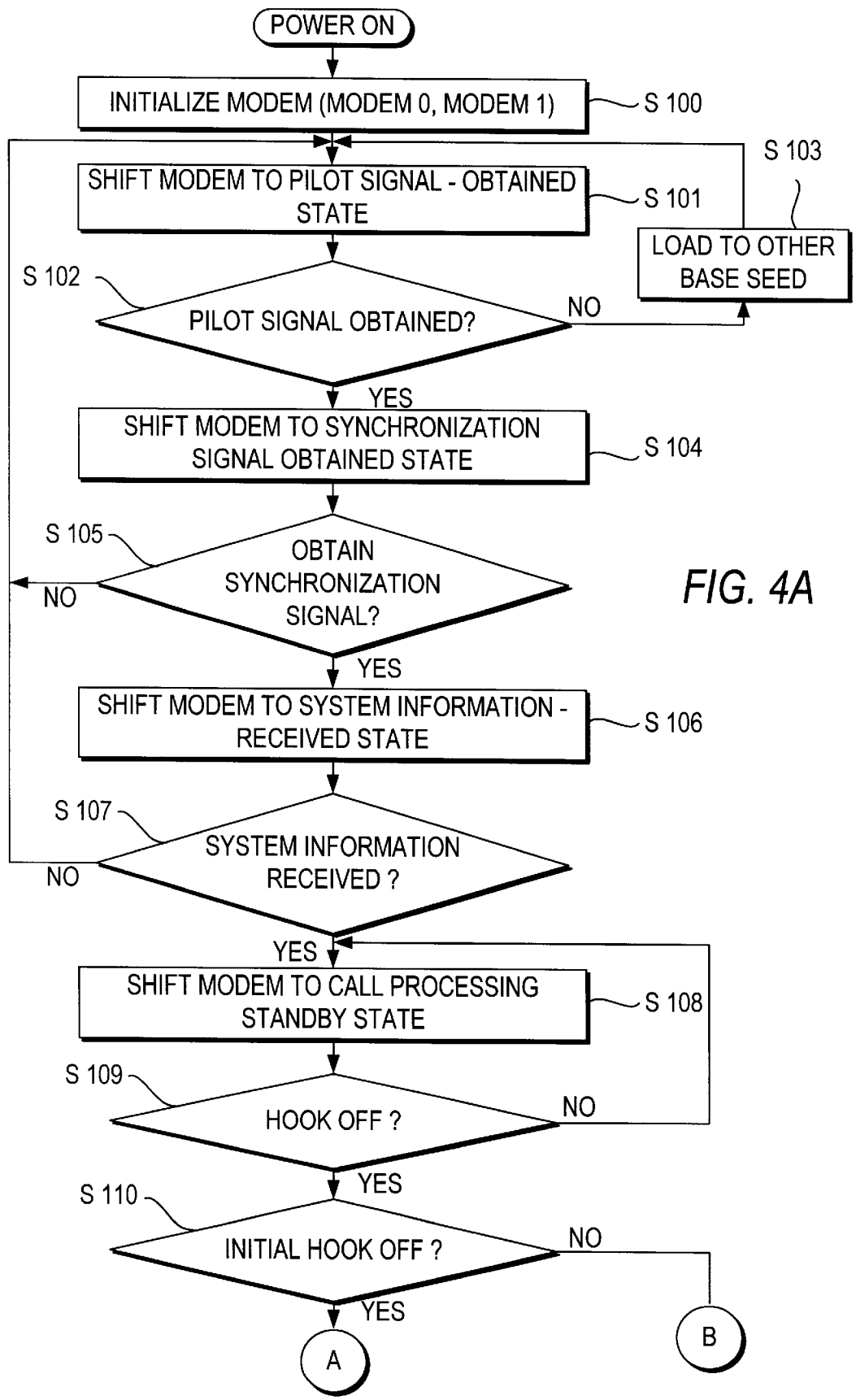
FIGS. 4A and 4B are flowcharts illustrating a process of controlling a single mode in wireless local loop network system according to the present invention.
Figure 4B:
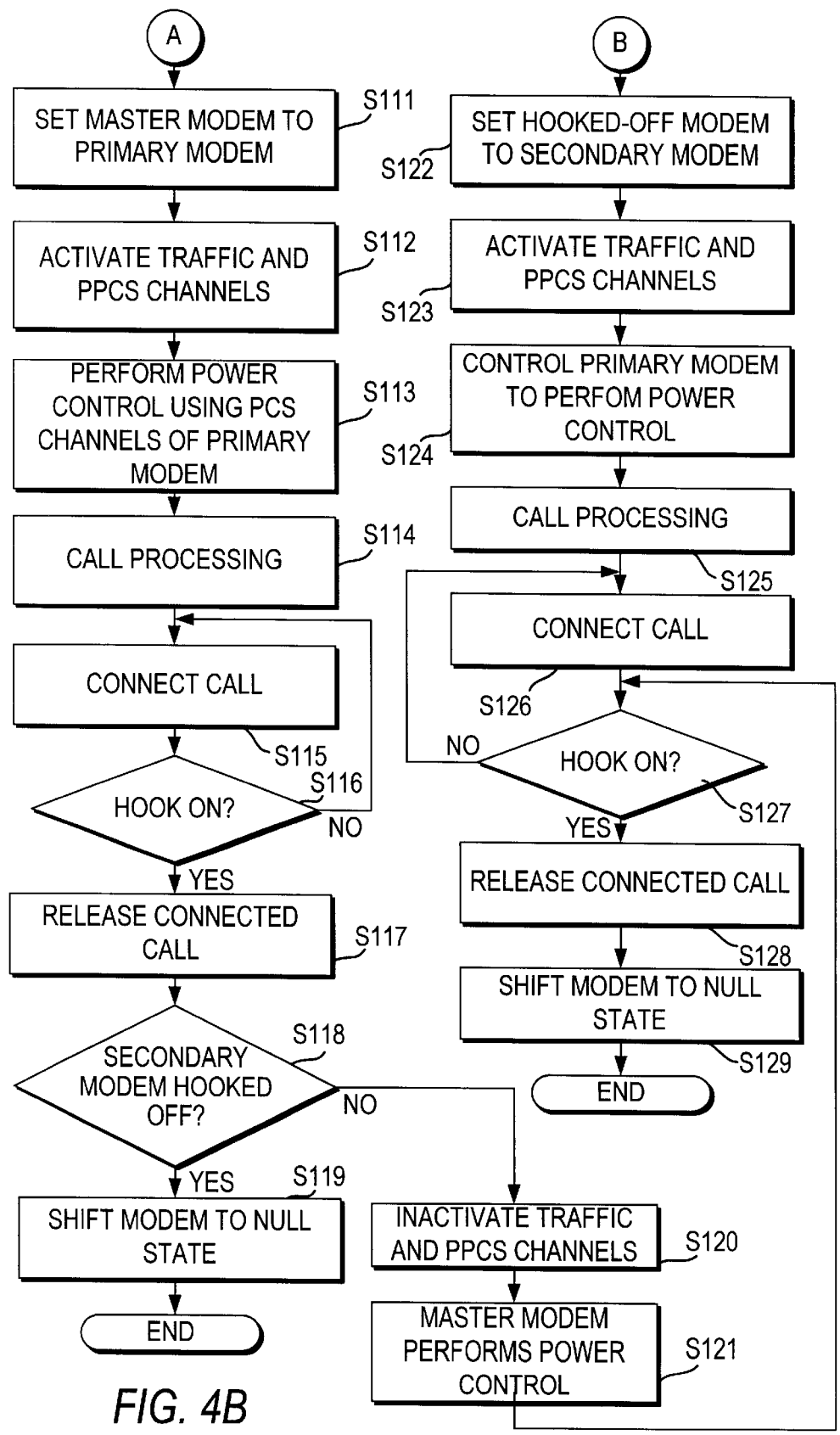
Figure 5A:
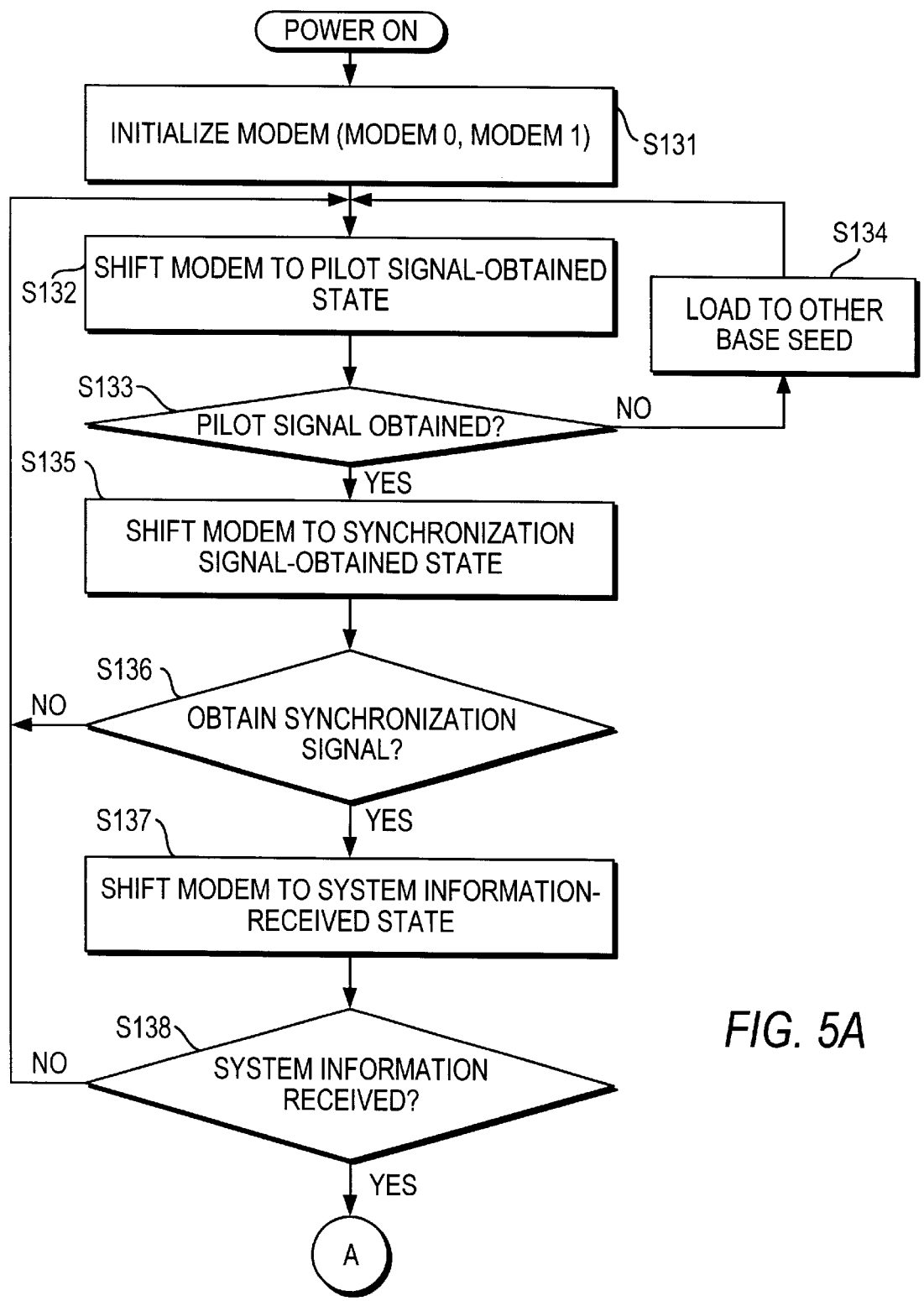
FIGS. 5A and 5B are flowcharts illustrating a process of controlling a multiple mode in wireless local loop network system according to the present invention.
Figure 5B:
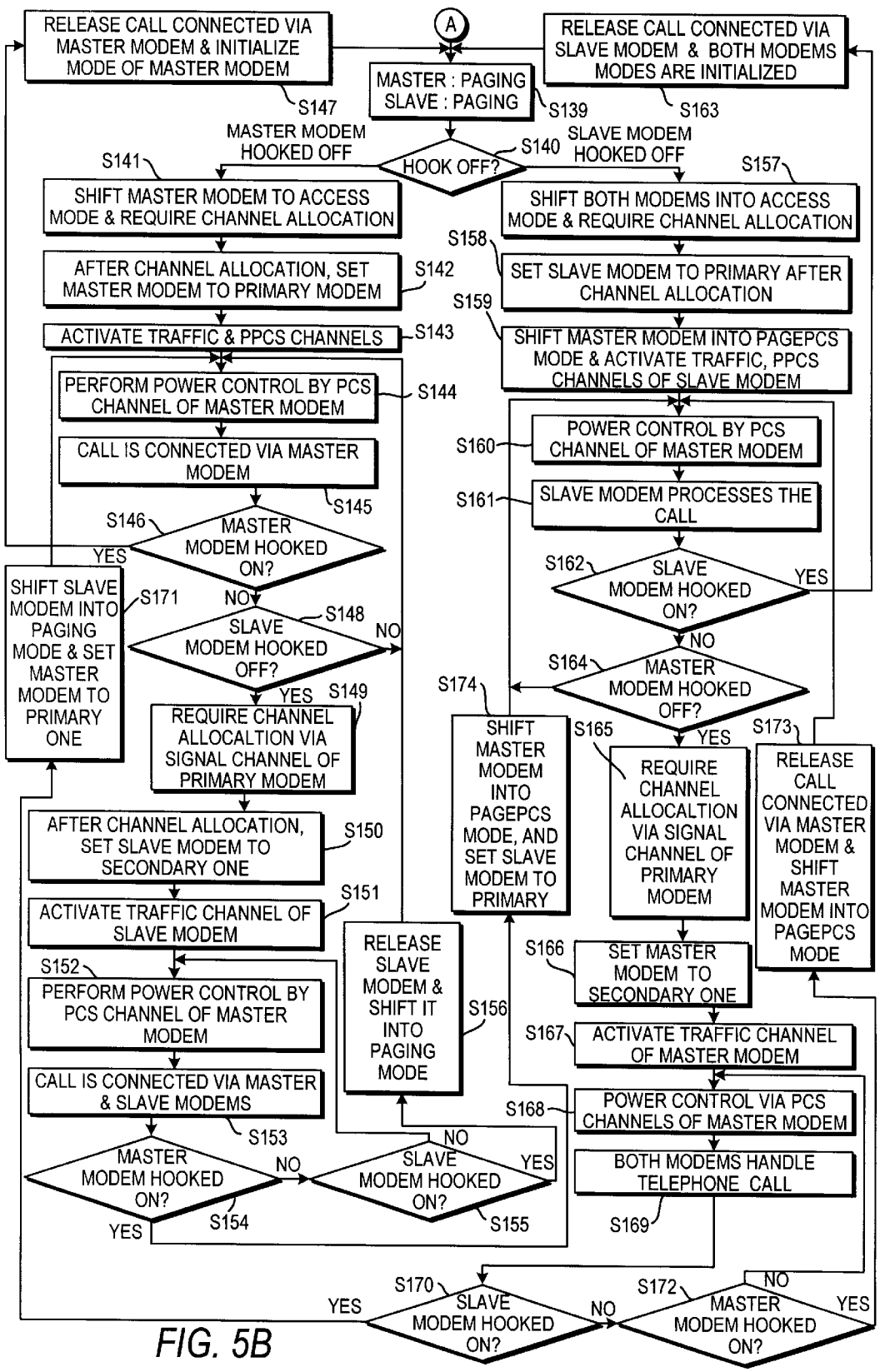

When the RIU of the present invention is controlled in a single mode, control module 400 initializes each modem, as shown in FIG. 4 (step S100). Subsequently, modems are shifted to pilot signal-obtained state (step S101) so as to obtain the pilot signal (step S102). Then, modems are shifted to a synchronization channel-obtained state, thus obtaining a synchronization signal (step S104).

Meanwhile, if the pilot signal is not obtained (step S102), modem state is loaded to other base seed is performed (step S103), and step S101 is repeatedly performed.

When the synchronization signal is obtained (step S105), modems are shifted to a system information-received state (step S106). When the system information is received (step S107), modems are shifted to a call processing standby state (step S108). At the state of call processing standby state, if hook off is detected by checking subscriber's terminal (step S109), Whether the hook off is initial one is checked (step S110). As a result of checking, if the hook off is initial, master modem 210 is set to a primary modem (step S111), and the traffic channel and PPCS channels are activated (step S112). Then, a power control is performed using the power control and signaling (PCS) channels of the primary modem (step S113).

Call processing is performed (step S114), and the call is connected (S115), at such a call-connected state, the relevant terminal is continuously checked in terms of hook state. When the terminal is hooked on, that is, when the call ends, the connected call is released, and the secondary modem (which means all slave modems) is checked in terms of hook state (steps S116 to S118). If, as a result of such checking, the secondary modem is hooked off, the master modem (primary modem) is shifted to a null state (call standby state) (step S119). If the secondary modem is hooked on, the traffic and PPCS channels are inactivated (step S120), and the master modem performs a power control (step S121).

Meanwhile, if the hook off detected in step S110 is not the initial one, which may mean that a call from the subscriber's terminal has already connected via other modem, the modem where the hook off is occurred is set as a secondary modem (step S122). Then, the traffic and PPCS channels are activated (step S123), and the primary modem is controlled to perform a power control (step S124). At such a state, the secondary modem performs call processing so as to connect the call, and when the call is connected, the user may talk over the line (or perform data communication) (steps S125 and S126). When the call is connected as described above, control module 400 continuously checks the state of the terminal. If such a check results in hook on, the call which is connected via the secondary modem is released (steps S127 and S128). Then, the secondary modem is shifted to a null state, i.e., call standby state (step S129).

Each modem of RIU is controlled as described above in a single mode.

Following description is for a control of RIU in a multiple mode.

First, control module 400 initializes each modem (step S131). Then, modems are shifted to a pilot signal obtain state (step S132), and when the pilot signal is obtained (step S133), modems are shifted to a synchronization signal-obtained state (step S135). If the pilot signal is not obtained, modem state is loaded to other base seed (step S134), and step S132 is repeatedly performed. When a synchronization signal is obtained (step S136), modems are shifted to a system information-received state (step S137). When the system information is received (step S138), modems are shifted to a paging state (step S139). At such a state, if hook off is occurred, it is checked whether the hook off is occurred in the master modem or slave modem (step S140). If the hook off is checked as being occurred in the master modem, the master modem is shifted to an access mode, and channel allocation is required (step S141). When channel allocation is completed, the master modem is set to a primary modem (step S142) Then, the traffic and PPCS channels of the master modem set to a primary modem are activated (step S143), and the master modem performs power control using power control and signaling channels (step S144).

When the call is connected via the master modem (step S145), it is checked whether hook on is occurred in the master modem (step S146). When hook on is checked as being occurred in the master modem, the call connected via the master modem is released, and mode of the master modem is initialized (step S147). When hook off is occurred in the slave modem (step S148), channel allocation is required via the signal channel of the primary modem, and when the channel allocation is completed, the slave modem is set to a secondary modem (steps S149 and S150). At such a state, the traffic channel of the slave modem is activated, and the master modem controls power of the secondary modem using power control and signaling channels (steps S151 and S152). The call is connected via the master modem and the slave modem (step S153), and it is continuously checked whether those modems are hooked on or off during the speaking of user over the line (step S154). At this time, if the master modem is hooked on, the master modem is shifted into a Pagepcs mode, and the slave modem (secondary modem) is set to a primary one (step S174). If the slave modem is hooked on at a state where the master modem is hooked off, the call connected via the slave modem is released, and the slave modem is shift into a paging mode (steps S155 and S156).

Meanwhile, if the hook off occurred in step S140 is determined as being occurred in the slave modem, both the master and slave modems are shifted into access mode, and a channel allocation is required (step S157). When the channel allocation completes, the slave modem is set to a primary one (step S158). Then, the master modem is shifted into Pagepcs mode, and the traffic and PPCS channels of the slave modem set as a primary one are activated (step S159). Then, power of the slave modem is controlled via PCS channels of the master modem, and the slave modem handle the telephone call (steps S160 and S161) During the handling of the telephone call by the slave modem, if the slave modem is hooked on, the telephone call connected via the slave modem is released, and both modems are initialized in terms of their mode (step S163). Differently from this, if the master modem is hooked off during the handling of the telephone call by the slave modem (step S164), channel allocation is required via the signal channel of the primary modem (slave modem) (step S165). When channel allocation is completed, the master modem is set to a secondary modem (step S166). Subsequently, the traffic channel of the master modem is activated (step S167), and power control is performed via PCS channels of the master modem (step S168). During the handling of the telephone call by both modems (step S169), if the slave modem is hooked on, the slave modem is shifted into a paging mode, and the master modem is set to a primary modem (step S171). If only the master modem is hooked on when the slave modem is hooked off, the call connected via the master modem is released, and the master modem is shifted into Pagepcs mode (steps 172 and 173).

RIU of WLL network system operates in accordance with the above-described process.

The process of shifting of the master modem and the slave modem in single or multiple mode can be illustrated as the following Tables 1 to 4.

Table 1 shows shift process of the master modem in a single mode, Table 2 shows shift process of the slave modem in a single mode, Table 3 shows shift process of the master modem in a multiple mode, and Table 4 shows shift process of the slave modem in a multiple mode.

TABLE 1

| To\From | Ini | Pil | Syn | Pag | Pag & PCS | Pag & Acc | Pag & PCS & Acc | Tra/PCS & Tra/PPCS | Tra/PCS & Tra/PPCS (0) |
|---|---|---|---|---|---|---|---|---|---|
| Ini | | Normal ending of Ini | | | | | | | |
| Pil | Abnormal (lock, fail, etc) | | Pil synchronization is obtained | | | | | | |
| Syn | Abnormal (lock, fail, etc) | | | | Normal ending of Syn. | | | | |
| Pag | Abnormal (lock, fail, etc) | | | | Allocate traffic to slave | Channel allocation request | | | |
| Pag & PCS | Abnormal (lock, fail, etc) | | | | Traffic Of all slave modem released | | | Channel allocation Requested | |
| Pag & Acc | Abnormal (lock, fail, etc) | | | Acc failed | | Traffic allocation to slave | Acc suceeded | | |
| Pag & PCS & Acc | Abnormal (lock, fail, etc) | | | | Acc failed | Traffic release of all slave | | Acc suceeded | |
| Tra/PCS & Tra/PPCS | Abnormal (lock, fail, etc) | | | Traffic Ffic of both modems released | Traffic release only at master | | | | |
| Tra/PCS & Tra/PPCS (0) | | | | | | | | | |

TABLE 2

| To\From | Ini | Pil | Syn | Pag | Pag & PCS | Pag & Acc | Pag & PCS & Acc | Tra/PCS & Tra/PPCS | Tra/PCS & Tra/PPCS (0) |
|---|---|---|---|---|---|---|---|---|---|
| Ini | | Normal ending of Ini | | | | | | | |

TABLE 2-continued

| To From | Ini | Pil | Syn | Pag | Pag & PCS | Pag & Acc | Pag & PCS & Acc | Tra/ PCS & Tra/ PPCS | Tra/ PCS & Tra/ PPCS (0) |
|---|---|---|---|---|---|---|---|---|---|
| Pil | Abnormal (lock, fail) | | Pil synchronization obtained | | | | | | |
| Syn | Abnormal (lock, fail) | | | Normal ending of Syn | | | | | |
| Pag | Abnormal (lock, fail) | | | | | Channel allocation requested | | | |
| Pag & PCS | | | | | | | | | |
| Pag & Acc | Abnormal (lock, fail) | | | Acc failed | | | | Acc succeeded | |
| Pag & PCS & Acc | | | | | | | | | |
| Tra/ PCS & Tra/ PPCS | Abnormal (lock, fail) | | | Traffic released | | | | | |
| Tra/ Pcs & Tra/ PPCS (0) | | | | | | | | | |

TABLE 3

| To From | Ini | Pil | Syn | Pag | Pag & PCS | Pag & Acc | Pag & PCS & Acc | Tra/ PCS & Tra/ PPCS | Tra/ PCS & Tra/ PPCS (0) |
|---|---|---|---|---|---|---|---|---|---|
| Ini | | Normal ending of Ini | | | | | | | |
| Pil | Abnormal (Lock, fail, etc) | | Pil synchronization is obtained | | | | | | |
| Syn | Abnormal (lock, fail, etc) | | | Normal ending of Syn. | | | | | |

TABLE 3-continued

| To From | Ini | Pil | Syn | Pag | Pag & PCS | Pag & Acc | Pag & PCS & Acc | Tra/ PCS & Tra/ PPCS | Tra/ PCS & Tra/ PPCS (0) |
|---|---|---|---|---|---|---|---|---|---|
| Pag | Abnormal (lock, fail, etc) | | | | Allocate traffic to slave | Channel allocation request | | | |
| Pag & PCS | Abnormal (lock, fail, etc) | | Traffic of all slave modem released | | | | | | Traffic allocated via signal channel of primary |
| Pag & Acc | Abnormal (lock, fail, etc) | | Acc failed | | | | | Acc suceed | |
| Pag & PCS & Acc | | | | | | | | | |
| Tra/ PCS & T ra/PP CS | Abnormal (lock, fail, etc) | | Traffic Is released, and no secondary | Traffic released and seconardy exists | | | | | |
| Tra/P CS & Tr a/PPC S(0) | Abnormal (lock, fail, etc) | | | Traffic released and slave exists | | | | Changed to primary | |

TABLE 4

| To From | Ini | Pil | Syn | Pag | Pag & PCS | Pag & Acc | Pag & PCS & Acc | Tra/ PCS & Tra/ PPCS | Tra/ PCS & Tra/ PPCS (0) |
|---|---|---|---|---|---|---|---|---|---|
| Ini | | Normal ending of Ini | | | | | | | |
| Pil | Abnormal (lock, fail) | | Pil synchronization obtained | | | | | | |

TABLE 4-continued

| To From | Ini | Pil | Syn | Pag | Pag & PCS | Pag & Acc | Pag & PCS & Acc | Tra/ PCS & Tra/ PPCS | Tra/ PCS & Tra/ PPCS (0) |
|---|---|---|---|---|---|---|---|---|---|
| Syn | Abnormal (lock, fail) | | | Normal ending of Syn | | | | | |
| Pag | Abnormal (lock, fail) | | | | | Channel allocation requested | | | Traffic allocated via sig. chan |
| Pag & PCS | | | | | | | | | |
| Pag & Acc | Abnormal (lock, fail) | | | Acc failed | | | | Acc succeeded | |
| Pag & PCS & Acc | | | | | | | | | |
| Tra/ PCS & Tra/ PPCS | Abnormal (lock, fail) | | | Traffic released & no secondary | | | | | |
| Tra/ PCS & Tra/ PPCS (0) | Abnormal (lock, fail) | | | | | | | Changed to primary | |

In the above Tables 1 to 4, "Ini" denotes a state of initializing each modem, "Pil" denotes a signal searching a pilot signal, "syn" denotes a state synchronous with a radio port, and of receiving a synchronization channel frame of the radio port, and "Page" denotes a state of receiving paging message and system guide message.

In addition, "Pag & PCS" denotes a state of receiving a paging message and a power control information from the radio port, "Page & Acc" denotes a state of receiving a paging power control information.

"Pag & PCS & Acc" denotes a state of receiving paging message and power control information from the radio port, and transmitting access message.

"Tra/PCS & Tra/PPCS" denotes a state of receiving traffic and PCS signals from a radio port and transmitting traffic and PPCS signals to the radio port. "Tra/PCS & Tra/PPCS (0)" denotes a state of receiving traffic and PCS signals from a radio port and transmitting traffic and PPCS signals (gain zero) to the radio port.

As described above, the present invention has an advantage in that both multiple mode service and single mode service are possible using a single algorithm and a single radio interface unit.

Further, modems in the radio interface unit are divided into master and slave so as to provide a rapid service, thus allowing enhanced system stability and efficient utilization of wireless source.

What is claimed is:

1. A radio interface unit in wireless local loop network system, in which said radio interface unit includes a subscriber interface module for interface with subscriber terminal and data, a high frequency processing module for transmitting/receiving radio data to/from a radio port via an antenna, and a modem for converting and interfacing data between the subscriber interface module and the high frequency module, said radio interface unit comprising:

a modem unit having a master modem which performs an automatic frequency control function for a direct control of a high frequency, power control function, and automatic gain control function, and is provided with a pilot channel, power control channel, and signaling channel only when the master modem operates as a primary one, and a plurality of slave modems which have pilot, power control and signaling channels and receive power control and signaling channels only when said slave modems operate as a primary modem, and which receive only said power control channel and signaling channel when they operate as a secondary modem; and a control module for controlling transmitting/receiving state of said modem unit and state of said subscriber interface module.

2. A method of controlling a single mode of radio interface unit in wireless local loop network system, said method of controlling a single mode of radio interface unit comprising:

a first step of obtaining a pilot signal by initializing master/slave modems and shifting said master modem into a state where a pilot signal is obtained;

a second step of obtaining a synchronization signal by shifting said master modem to a state where a synchronization signal is obtained;

a third step of receiving system information message, shifting said modems to a call processing standby state, and confirming whether a call request exists or not;

a fourth step of achieving power control and call processing by confirming whether said call request is an initial event or not, when said call request exists, and setting said master modem to a primary modem if said call request is an initial event;

a fifth step of setting said slave modem to a secondary modem when said call request is not an initial event, performing power control on said secondary modem via said master modem, and controlling said secondary modem to perform a call processing;

a sixth step of releasing said call connected via said master modem and shifting said master modem to a call standby state when said call processing in said master modem ends in said fifth step, and checking state of said secondary modem and performing power control on said master modem when said secondary modem is in a call processing state; and a seventh step of releasing a call which is connected to said secondary modem when said call processing in said secondary modem ends, shifting said secondary modem to a call standby state, and completing modem control.

3. A method of controlling a single mode of radio interface unit in wireless local loop network system according to claim 2, wherein said fourth step further comprises:

a first sub-step of setting said mater modem to a primary one when an event occurs;

a second sub-step of activating a traffic channel and pilot, power control, and signaling (PPCS) channels of said primary modem;

a third sub-step of performing a power control using power control and signaling (PCS) channels of said primary modem;

a fourth sub-step of performing call processing via said primary modem; and a fifth sub-step of allowing a speech when calling is connected by said call processing.

4. A method of controlling a single mode of radio interface unit in wireless local loop network system according to claim 2, wherein said fifth step further comprises:

a first sub-step of setting said slave modem where an event occurs to a secondary modem;

a second sub-step of activating a traffic channel and PPCS channels of said secondary modem;

a third sub-step of allowing said master modem which is set as said primary modem to perform a power control of said secondary modem;

a fourth sub-step of performing call processing via said secondary modem; and a fifth sub-step of allowing a speech when calling is connected by said call processing.

5. A method of controlling a multiple mode of radio interface unit in wireless local loop network system, said method of controlling a single mode of radio interface unit comprising:

a first step of obtaining a pilot signal by initializing master modem and slave modem and shifting said master modem into a pilot signal obtained state;

a second step of obtaining a synchronization signal by shifting said master modem to a synchronization signal obtained state;

a third step of receiving system information message, shifting said two modems to a paging state, and confirming whether a call request exists or not;

a fourth step of achieving power control and call processing by activating said mater modem into an access mode, when said call request is determined as being occurred via said master modem, and setting said master modem to a primary modem after channel allocation is completed;

a fifth step of setting said slave modem to a secondary modem when a call request occurs via said slave modem during call processing of said master modem, controlling said secondary modem to perform a call processing;

a sixth step of activating said slave modem to an access mode, performing channel allocation, and setting said slave modem to a primary one when said call request occurs via said slave modem, performing power control on said slave modem via said master modem, and controlling said slave modem to perform a call processing;

a seventh step of setting said master modem to a secondary modem when a call request occurs via said master modem during call processing of said slave modem, and controlling said secondary modem to perform call processing;

an eighth step of releasing said call connected via said master modem and setting said slave modem to a primary one when a speech connected via said master modem ends during a time period where said master modem operates as a primary one and said slave modem operates as a secondary one; and a ninth step of releasing said call connected via said slave modem and setting said master modem to a primary one when a speech connected via said slave modem ends during a time period where said slave modem operates as a primary one and said master modem operates as a secondary one.

6. A method of controlling a multiple mode of radio interface unit in wireless local loop network system according to claim 5, wherein said fourth step further comprises:

a first sub-step of shifting said master modem to an access mode and requesting channel allocation when hook off occurs in said master modem;

a second sub-step of setting said master modem to a primary modem after channel allocation is completed;

a third sub-step of activating traffic and PPCS channels of said master modem;

a fourth sub-step of performing power control by PCS channels of said master modem;

a fifth sub-step of allowing a speech via said master modem; and a sixth sub-step of releasing the call connected via said master modem and initializing mode of said master modem when a hook on occurs from said master modem during a time period where a speech via said master modem is performed.

7. A method of controlling a multiple mode of radio interface unit in wireless local loop network system according to claim 5, wherein said fifth step further comprises:

a first sub-step of requesting channel allocation via a signal channel of a primary modem when a hook off occurs in said slave modem during a hook off of said master modem;

a second sub-step of setting said slave modem to a secondary modem when said channel allocation is achieved;

a third sub-step of activating a traffic channel of said slave modem;

a fourth sub-step of performing power control on said slave modem via PCS channels of said master modem; and a fifth sub-step of allowing a speech via both said master and slave modems.

8. A method of controlling a multiple mode of radio interface unit in wireless local loop network system according to claim 5, wherein said sixth step further comprises:

a first sub-step of shifting both master and slave modems into access mode and requiring channel allocation when said slave modem is hooked off at a state where both master and slave modems are in paging mode;

a second sub-step of setting said slave modem to a primary modem after said channel allocation is completed;

a third sub-step of shifting said master modem into a Pagepcs mode and activating traffic and PPCS channels of said slave modem;

a fourth sub-step of performing power control on said slave modem using PCS channels of said master modem;

a fifth sub-step of connecting call via said slave modem and allowing a speech; and a sixth sub-step of detecting hook state of said slave modem, releasing said call connected via said slave modem when a hook on is detected in said slave modem, and initializing modes of both said master and slave modems.

9. A method of controlling a multiple mode of radio interface unit in wireless local loop network system according to claim 5, wherein said seventh step further comprises:

a first sub-step of requiring channel allocation via a signal channel of a primary modem when a hook off occurs from said master modem during said slave modem operates as a primary modem;

a second sub-step of performing said channel allocation and setting said master modem to a secondary one;

a third sub-step of activating a traffic channel of said master modem;

a fourth sub-step of performing power control via PCS channels of said master modem; and a fifth sub-step of allowing a speech via said activated master modem and slave modem.

* * * * *